(12) United States Patent
Peng

(10) Patent No.: US 8,452,770 B2
(45) Date of Patent: May 28, 2013

(54) CONSTRAINED NONNEGATIVE TENSOR FACTORIZATION FOR CLUSTERING

(75) Inventor: Wei Peng, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 369 days.

(21) Appl. No.: 12/837,021

(22) Filed: Jul. 15, 2010

(65) Prior Publication Data
US 2012/0016878 A1    Jan. 19, 2012

(51) Int. Cl.
*G06F 17/30* (2006.01)

(52) U.S. Cl.
CPC ................................ *G06F 17/30598* (2013.01)
USPC ........................................... 707/737; 706/52

(58) Field of Classification Search
USPC ............................................. 707/737; 706/52
See application file for complete search history.

(56) References Cited

U.S. PATENT DOCUMENTS

| | | | | |
|---|---|---|---|---|
| 8,090,665 | B2 * | 1/2012 | Yang et al. | 705/319 |
| 8,099,381 | B2 * | 1/2012 | Chi et al. | 706/62 |
| 8,204,988 | B2 * | 6/2012 | Lin et al. | 709/224 |
| 2002/0145425 | A1 * | 10/2002 | Ebbels et al. | 324/309 |
| 2009/0055139 | A1 * | 2/2009 | Agarwal et al. | 703/2 |
| 2009/0290802 | A1 * | 11/2009 | Hua et al. | 382/225 |
| 2009/0299705 | A1 * | 12/2009 | Chi et al. | 703/2 |
| 2009/0306932 | A1 * | 12/2009 | Li et al. | 702/179 |
| 2010/0185578 | A1 * | 7/2010 | Chi et al. | 706/52 |
| 2011/0055379 | A1 * | 3/2011 | Lin et al. | 709/224 |
| 2011/0295903 | A1 * | 12/2011 | Chen | 707/794 |

OTHER PUBLICATIONS

Christos Faloutsos et al., "Mining Large Time—Evolving Data Using Matrix and Tensor Tools," International Conference on Data Mining, 2007, slides.*
Harshman, Richard, PARAFAC: Parallel factor analysis, Computational Statistics and Data Analysis 18, 1994, pp. 39-72.*
Jos M.F. Ten Berge, Simplicity and typical rank of three way arrays, with applications to Tucker—3 analysis with simple cores, Journal of Chemometrics, 2004, pp. 17-21.*
Kolda, Tamara, Tensor Decompositions and Applications, SIAM Review, Jun. 10, 2008, pp. 1-47.*
Cho et al., "Minimum Sum-Squared Residue Co-clustering of Gene Expression Data", SIAM 2002, Department of Computer Sciences, University of Texas, Austin, TX, pp. 1-12, 2004.
Dhillon et al., "Information-Theoretic Co-clustering", In "Proceedings of the Ninth ACM SIGKDD International Conference on Knowledge Discovery and Data Mining ", Washington, DC, Aug. 24-27, 2003, pp. 89-98.
Kim et al., "Nonnegative Tucker Decomposition", Department of Computer Science, POSTECH, Korea, pp. 1-8.

(Continued)

*Primary Examiner* — Shahid Alam
*Assistant Examiner* — Alexandria Bromell
(74) *Attorney, Agent, or Firm* — Fox Rothschild LLP

(57) ABSTRACT

Methods and systems for clustering information items using nonnegative tensor factorization are disclosed. A processing device receives one or more class labels, each corresponding to an information item, a selection for a nonnegative tensor factorization model having an associated objective function and one or more parameter values, each corresponding to one of one or more penalty constraints. The processing device determines a constrained objective function based on the objective function associated with the selected nonnegative tensor factorization model, the one or more parameter values and the one or more class labels and including the one or more penalty constraints. The processing device determines clusters for the plurality of information items by evaluating the constrained objective function. Pairwise constraints may be received in addition to or instead of the class labels.

17 Claims, 6 Drawing Sheets

OTHER PUBLICATIONS

Lee et al., "Algorithms for Non-negative Matrix Factorization", In "Advances in Neural Information Processing Systems", vol. 13, MIT Press, 2001.

Ding et al., "Convex and Semi-Nonnegative Matrix Factorizations", Department of Computer Science and Engineering, University of Texas, Arlington, TX, Oct. 24, 2008, pp. 1-26.

Li et al., "Solving Consensus and Semi-supervised Clustering Problems using Nonnegative Matrix Factorization", in ICDM, pp. 577-582, 2007.

Li et al.,"Knowledge Transformation from Word Space to Document Space", SIGIR 08, Jul. 20-24, 2008, Singapore, pp. 187-194.

Harshman, "Foundations of the Parafac Procedures: Models and Conditions for an "Explanatory" Multimodal Factor Analysis", UCLA, Working Papers in Phonetics, Dec. 16, 1970, pp. 1-84, University Microfilms, Ann Arbor, MI.

Shashua et al., "Non-Negative Tensor Factorization with Applications to Statistics and Computer Vision", Proceedings of the 22nd International Conference of Machine Learning, Bonn, Germany 2005, pp. 1-8.

Strehl et al., "Cluster Ensembles—A Knowledge Reuse Framework for Combining Multiple Partitions", Journal of Machine Learning Research, 3, 2002, pp. 583-617.

Wang et al., "Semi-Supervised Clustering via Matrix Factorization", In "Proceedings of 2008 Siam International Conference on Data Mining", 2008, pp. 1-12.

\* cited by examiner

CONSTRAINED NONNEGATIVE TENSOR FACTORIZATION FOR CLUSTERING

BACKGROUND

Clustering is a well known data mining construct used to identify groups of similar objects. Unsupervised clustering splits data purely based on distance between data points, which can make clustering results unreliable.

In many real world applications, some prior knowledge or domain knowledge can be used to constrain or guide a clustering process in order to produce more acceptable data partitions. For example, semi-supervised clustering uses limited prior knowledge together with unlabeled data to achieve better clustering performance. Semi-supervised clustering typically employs two types of prior knowledge, class labels and pairwise constraints, to improve upon results obtained from unsupervised clustering.

One method of performing semi-supervised clustering is nonnegative matrix factorization. Nonnegative Matrix Factorization (NMF) penalizes its objective function using constraints. NMF factorizes an input nonnegative matrix into a product of two new matrices of lower rank. Semi-supervised clustering through matrix factorization has been shown to largely improve clustering accuracy by incorporating prior knowledge into the factorization process.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of clustering a plurality of information items using nonnegative tensor factorization may include receiving, by a processing device, one or more class labels, where each class label corresponds to an information item, receiving, by the processing device, a selection for a nonnegative tensor factorization model having an associated objective function, receiving, by the processing device, one or more parameter values, where each parameter value corresponds to one of one or more penalty constraints, determining, by the processing device, a constrained objective function including the one or more penalty constraints, where the constrained objective function is based on the objective function associated with the selected nonnegative tensor factorization model, the one or more parameter values and the one or more class labels, and determining, by the processing device, clusters for the plurality of information items by evaluating the constrained objective function.

In an embodiment, a method of clustering a plurality of information items using nonnegative tensor factorization may include receiving, by a processing device, one or more pairwise constraints, where each pairwise constraint corresponds to a plurality of information items, receiving, by the processing device, a selection for a nonnegative tensor factorization model having an associated objective function, receiving, by the processing device, one or more parameter values, where at least one parameter value corresponds to each of one or more penalty constraints, determining, by the processing device, a constrained objective function including the one or more penalty constraints, where the constrained objective function is based on the objective function associated with the selected nonnegative tensor factorization model, the one or more parameter values and the one or more pairwise constraints, and determining, by the processing device, clusters for the plurality of information items by evaluating the constrained objective function.

In an embodiment, a system for clustering information using nonnegative tensor factorization may include a processor, and a processor-readable storage medium in communication with the processor. The processor-readable storage medium may contain one or more programming instructions for performing the following when executed by the processor: receiving one or more class labels, where each class label corresponds to an information item, receiving a selection for a nonnegative tensor factorization model having an associated objective function, receiving one or more parameter values, where each parameter value corresponds to one of one or more penalty constraints, determining a constrained objective function including the one or more penalty constraints, where the constrained objective function is based on the objective function associated with the selected nonnegative tensor factorization model, the one or more parameter values and the one or more class labels, and determining clusters for the plurality of nodes by evaluating the constrained objective function.

In an embodiment, a system for clustering information using nonnegative tensor factorization may include a processor, and a processor-readable storage medium in communication with the processor. The processor-readable storage medium may contain one or more programming instructions for performing the following when executed by the processor: receiving one or more pairwise constraints, where each pairwise constraint corresponds to a plurality of information items, receiving a selection for a nonnegative tensor factorization model having an associated objective function, receiving one or more parameter values, where at least one parameter value corresponds to each of one or more penalty constraints, determining a constrained objective function including the one or more penalty constraints, where the constrained objective function is based on the objective function associated with the selected nonnegative tensor factorization model, the one or more parameter values and the one or more pairwise constraints, and determining clusters for the plurality of information items by evaluating the constrained objective function.

DETAILED DESCRIPTION

Figure 1:
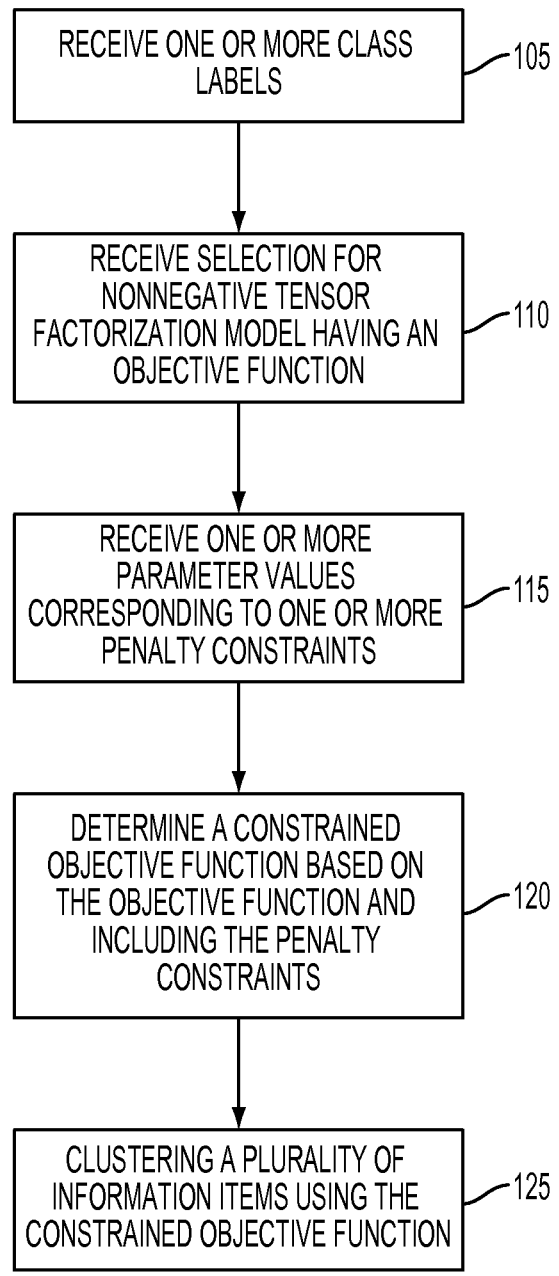
FIG. 1 depicts a flow chart of an exemplary method of performing nonnegative tensor factorization with partial class label constraints according to an embodiment.

The following terms shall have, for the purposes of this application, the respective meanings set forth below.

An "information item" is a data element corresponding to an object or event. For example, a document may be described by an information item having author information, term information and publication date (i.e., time) information. Similarly, an email communication may have an information item having sender, receiver and time information. Each information item may have a plurality of associated pieces of information.

A "cluster" is a group of information items that are similar in some way.

A "matrix" is an array of values having two dimensions.

A "tensor" is an array of values having three or more dimensions.

A "factorization model" is a mathematical model used to cluster items.

A "nonnegative tensor factorization model" is a factorization model for which the input tensor entries and the output component matrices or tensors are nonnegative.

An "objective function" is a mathematical function to be maximized or minimized in optimization theory. A "constrained" objective function is an objective function having one or more constraints.

A "class label" represents prior knowledge with respect to whether particular information is associated with a particular class. For example, prior knowledge that an email was sent within a particular time range may cause the email to be classified within a particular class associated with the time range based on such prior knowledge. Initial classification of the email based on the time information class label may be updated based on other information associated with the email.

A "pairwise constraint" is a constraint between two or more elements to be clustered. Types of pairwise constraints may include, for example and without limitation, a "must-link" constraint or a "cannot link" constraint. A must-link constraint imposes a penalty to break the link between the linked elements by not placing the elements in the same class. A cannot-link constraint imposes a similar penalty to break the link between the linked elements (i.e., by placing the linked elements in the same class).

A "penalty constraint" is a mathematical constraint used to weight prior knowledge associated with an information type.

Matrix factorization is limited because it cannot account for multi-way data factorization. In document clustering, publications over different time periods can be represented as a three-way dataset as authors×terms×time. In email communications, the emails can be represented as sender×receiver×time. Other clustering environments may include web page personalization (user×query word×webpage), high-order web link analysis (web page×web page×anchor text) and/or the like. Rather than performing traditional two-way data analysis (e.g., matrix decomposition) by unwrapping multi-way data into matrices and assuming only pairwise relationships between two modes (rows and columns), multi-way data analysis methods (e.g., tensor factorization) in these applications consider the relationships among multiple modes.

Two general tensor factorization models that are commonly used are parallel factor analysis (Parafac) and the Tucker model. Parafac is a multi-linear form of decomposition for an objective tensor. Each entry of, for example, a three-way tensor is approximated by a linear combination of three vectors. The Tucker model is a multi-way component analysis that attempts to provide an optimal low rank approximation of a tensor in given dimensions. Many multi-way models are extensions or modifications of the general models.

General formulations of constrained nonnegative tensor factorization (NTF) models using class labels and pairwise constraints, respectively, are disclosed herein. Alternating update algorithms are also described with nonnegative solutions.

The following notations are used throughout this disclosure. Scalar values are represented by lowercase letters (e.g., x), and vectors are represented using boldface lowercase letters (e.g., x). Matrices are represented by boldface uppercase letters (e.g., X), where the $i^{th}$ column of X is $x_i$ and the (i, j)-th entry is $x_{ij}$. Tensors are represented by boldface underlined capital letters (e.g., $\underline{X}$) which can be unfolded in the $n^{th}$ mode to form a matrix by $\overline{X}_{(n)}$. The c-th frontal slice of $\underline{X}$, denoted by $\underline{X}_c$, is formed by holding the last mode of the multi-way array fixed at c. The symbol ⊗ represents the Kronecker product. The Kronecker product of the matrix $A \in \Re^{a \times b}$ and the matrix $B \in \Re^{c \times d}$ is a matrix $C \in \Re^{ac \times bd}$, where each entry in C is the product of entries from A and B, respectively. The symbol denotes the Khatri-Rao product. This product assumes the partitions of the matrices are their columns. In this case, if A is a m-by-n matrix and B is a p-by-n matrix, A*B is a mp-by-n matrix of which each column is the Kronecker product of the corresponding columns of A and B. For example, if $$A = [A_1 | A_2 | A_3] = \begin{bmatrix} 1 & 2 & 3 \\ 4 & 5 & 6 \\ 7 & 8 & 9 \end{bmatrix} \text{ and } B = [B_1 | B_2 | B_3] = \begin{bmatrix} 1 & 4 & 7 \\ 2 & 5 & 8 \\ 3 & 6 & 9 \end{bmatrix},$$

$$\text{then } A * B = [A_1 \otimes B_1 | A_2 \otimes B_2 | A_3 \otimes B_3] = \begin{bmatrix} 1 & 8 & 21 \\ 2 & 10 & 24 \\ 3 & 12 & 27 \\ 4 & 20 & 42 \\ 8 & 25 & 48 \\ 12 & 30 & 54 \\ 7 & 32 & 63 \\ 14 & 40 & 72 \\ 21 & 48 & 81 \end{bmatrix}.$$

Finally, $\|X\|_F = \sqrt{\Sigma_{ij} x_{ij}^2}$ is the Frobenius norm of the matrix X.

One characteristic of a nonnegative tensor factorization is that the entries of the input tensor and the output component tensors are nonnegative. The nonnegative Parafac model is represented by the following equation: $X_l = U S_l V^T$. The objective function may be represented as follows:

$$\min_{U,V,S} \|\underline{X}_{(1)} - U(S*V)^T\|_F^2,$$

where $\underline{X} \in \Re^{n \times m \times p}$, $U \in \Re^{n \times k}$, $V \in \Re^{m \times k}$, $S \in \Re^{p \times k}$, $S_l$ is a diagonal matrix with the l-th row of S on the diagonal and $u_{ip} \geq 0$, $v_{ip} \geq 0$, and $s_{ip} \geq 0$. It is noted that $$\min_{U,V,S} \|X_{(1)} - U(S*V)^T\|_F^2 =$$

$$\min_{U,V,S} \|X_{(2)} - V(S*U)^T\|_F^2 = \min_{U,V,S} \|X_{(3)} - S(V*U)^T\|_F^2.$$

The non-negative Tucker3 model is represented by the following equation:

$X_{(1)} = UG_{(1)}(S \otimes V)^T$, where $U \in \Re^{n \times k_1}$, $V \in \Re^{m \times k_2}$, $S \in \Re^{p \times k_3}$, and $G \in \Re^{k_1 \times k_2 \times k_3}$.

As disclosed below, the nonnegative Parafac model is modified to incorporate penalty constraint terms for breaking constraints. It will be apparent to one of ordinary skill in the art that penalty constraint terms disclosed below may be applied to the Tucker3 nonnegative tensor factorization model or any other nonnegative tensor factorization model in a corresponding manner.

FIG. 1 depicts a flow chart of an exemplary method of clustering a plurality of information items using nonnegative tensor factorization with partial class label constraints according to an embodiment. As shown in FIG. 1, one or more class labels may be identified 105. Each class label may correspond to an information item to be clustered. Class labels for a first information type may be represented as a matrix $U_0$, where the rows represent information of the first information type, and the columns represent classes. Each entry of matrix $U_0$ may represent the probability of the information corresponding to the row of the entry belonging to a class corresponding to the column of the entry based on prior knowledge. A row of $U_0$ having all zeros may represent information for which no knowledge regarding a class label is present. Similarly, class labels for second and third information types may be represented as matrices $V_0$ and $S_0$, respectively. For example, if clustering is to be performed for publications over time in which the information items comprise authors×terms×time information, each entry of $U_0$ may represent the probability that an author (represented by the row) is associated with a particular class, each entry of $V_0$ may represent the probability that a term is associated with a particular class, and each entry of $S_0$ may represent the probability that a time is associated with a particular class. In an embodiment, identifying 105 one or more class labels may be performed by receiving one or more class labels by a processing device, such as the one described in reference to FIG. 3 below.

A nonnegative tensor factorization model may then be determined 110. The nonnegative tensor factorization model is associated with an objective function. In an embodiment, the objective function may be the nonnegative Parafac tensor factorization model. In an alternate embodiment, the objective function may be the nonnegative Tucker3 tensor factorization model. Alternate models may also be used within the scope of this disclosure. In an embodiment, determining 110 the nonnegative tensor factorization model may be performed by receiving a selection for the nonnegative tensor factorization model by a processing device, such as the one described in reference to FIG. 3.

One or more parameter values, each corresponding to a penalty constraint, may be determined 115 with respect to the class labels. The penalty constraints may be used to incorporate class label information into a tensor factorization model. In an embodiment, a penalty constraint may be determined with respect to each information type. In an embodiment, determining 115 one or more penalty constraints may be performed by receiving one or more parameter values by a processing device, such as the one described in reference to FIG. 3. In such an embodiment, each parameter value may correspond to one of one or more penalty constraints.

A constrained objective function including the one or more penalty constraints may be determined 120. The constrained objective function may be based on the objective function for the selected nonnegative tensor factorization model, the one or more parameter values and the one or more class labels. For example, a constrained objective function based on the nonnegative Parafac tensor factorization model including one or more penalty constraints may be represented as follows:

$$J = \min_{U,V,S} \|X_{(1)} - U(S*V)^T\|_F^2 +$$

$$\alpha_1 \|E^u U - U_0\|_F^2 + \alpha_2 \|E^v V - V_0\|_F^2 + \alpha_3 \|E^s S - S_0\|_F^2.$$

Each of the $\alpha_1\|E^uU-U_0\|_F^2$, $\alpha_2\|E^vV-V_0\|_F^2$, and $\alpha_3\|E^sS-S_0\|_F^2$ terms are penalty constraints where $U_0 \in \Re^{n \times k}$, $V_0 \in \Re^{m \times k}$, and $S_0 \in \Re^{p \times k}$ represent partial prior knowledge of class labels of information on rows (mode 1), columns (mode 2) and occasions (mode 3), respectively. $E^u$, $E^v$ and $E^s$ are diagonal matrices in which a value of 1 represents that prior knowledge exists for the corresponding information. Such matrices can be derived from $U_0$, $V_0$ and $S_0$. $\alpha_1 \geq 0$, $\alpha_2 \geq 0$, and $\alpha_3 \geq 0$ are parameter values used to weight the influence of the penalty constraints. It is noted that the constrained objective function above can be rewritten as follows:

$$J = \min_{U,V,S} \|X_{(1)} - U(S*V)^T\|_F^2 +$$

$$\|\alpha_1 E^u U - U_0\|_F^2 + \|\alpha_2 E^v V - V_0\|_F^2 + \|\alpha_3 E^s S - S_0\|_F^2,$$

where $\alpha_1 E^u$, $\alpha_2 E^v$ and $\alpha_3 E^s$ may be regarded as weights of an overall influence of prior knowledge. In an embodiment, determining 120 a constrained objective function may be performed by a processing device, such as the one described in reference to FIG. 3.

Clusters may be determined 125 for the plurality of modes by resolving the constrained objective function. In an embodiment, determining 125 clusters may be performed by applying a nonnegative multiplicative least square algorithm to the constrained objective function. The nonnegative multiplicative least square algorithm may update cluster information for one information type at a time while the other information types remain fixed. For the constrained objective function described above, the following computations may be performed iteratively until convergence or for an identified number of iterations in order to determine 125 clusters:

$$u_{ij} = u_{ij} \frac{(X_{(1)}(S*V) + \alpha_1 U_0)_{ij}}{(U(S*V)^T(S*V) + \alpha_1 E^u U)_{ij}},$$

$$v_{ij} = v_{ij} \frac{(X_{(2)}(S*U) + \alpha_2 V_0)_{ij}}{(V(S*U)^T(S*U) + \alpha_2 E^v V)_{ij}},$$

$$\text{and } s_{ij} = s_{ij} \frac{(X_{(3)}(V*U) + \alpha_3 S_0)_{ij}}{(S(V*U)^T(V*U) + \alpha_3 E^s S)_{ij}}.$$

Figure 3:
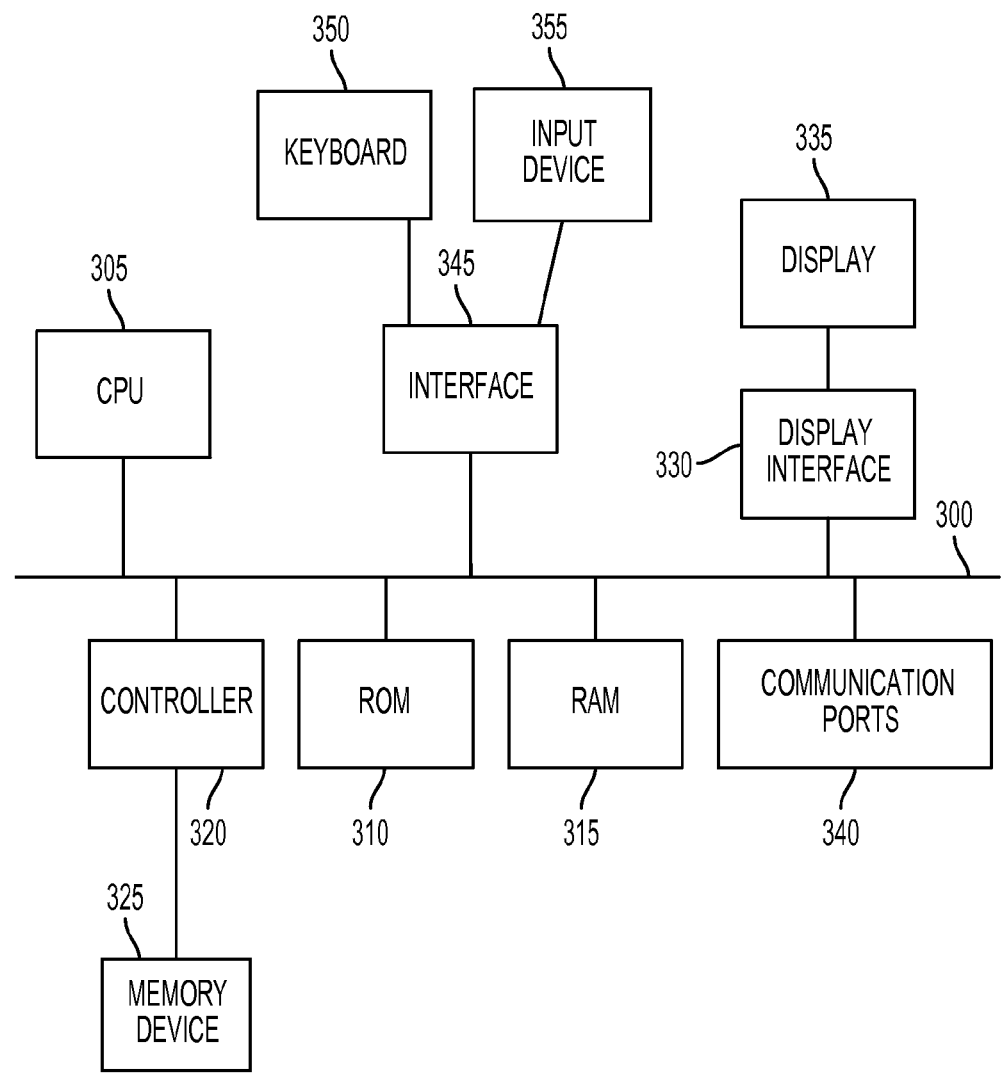
FIG. 3 depicts a block diagram of exemplary internal hardware that may be used to contain or implement program instructions according to an embodiment.
Figure 4A:
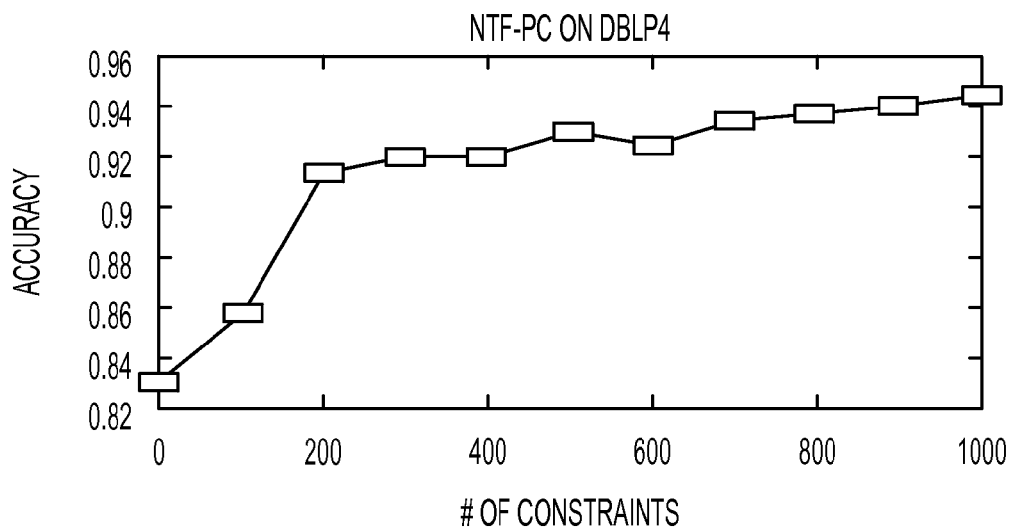
FIGS. 4A-4D depict the clustering performance of nonnegative tensor factorization with pairwise constraints of authors according to an example with respect to two datasets.
Figure 4B:
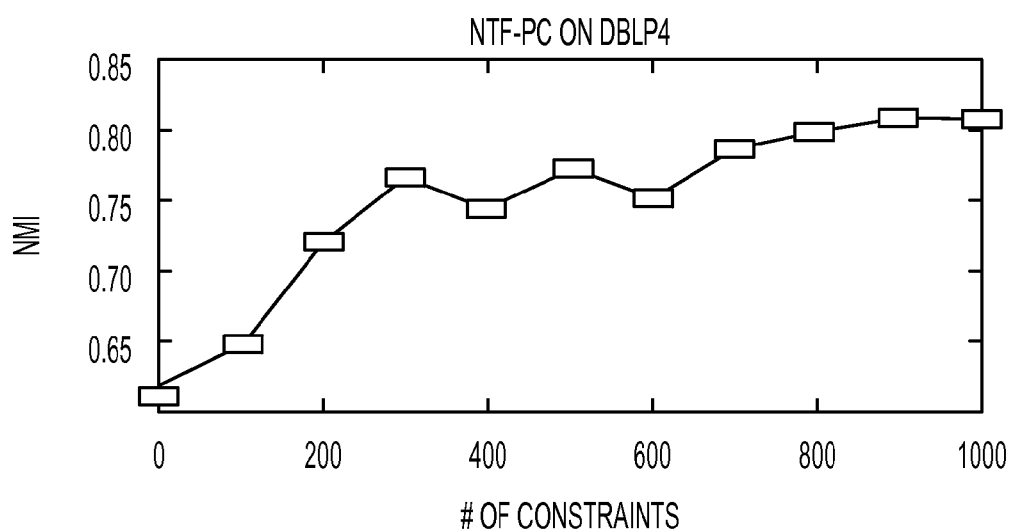
Figure 4C:
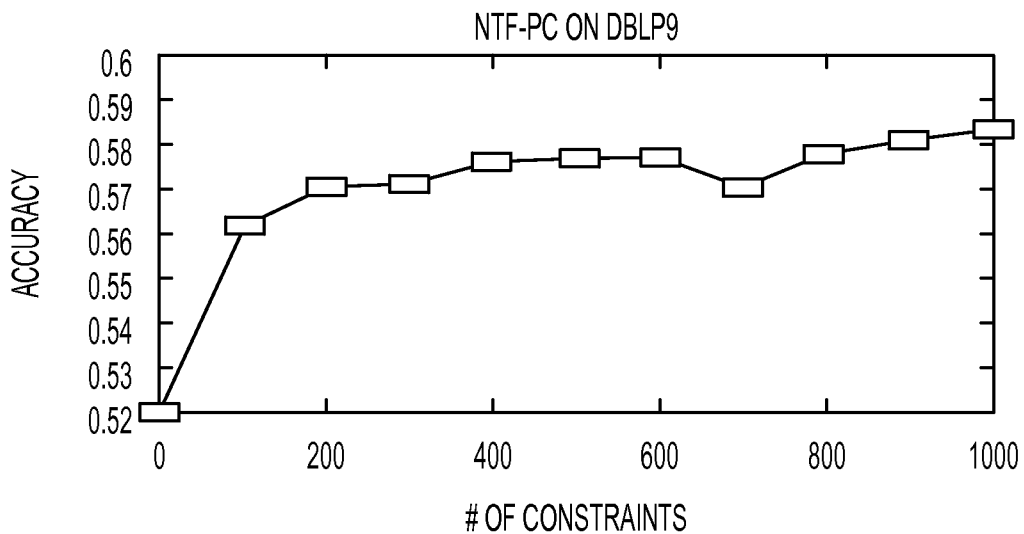
Figure 4D:
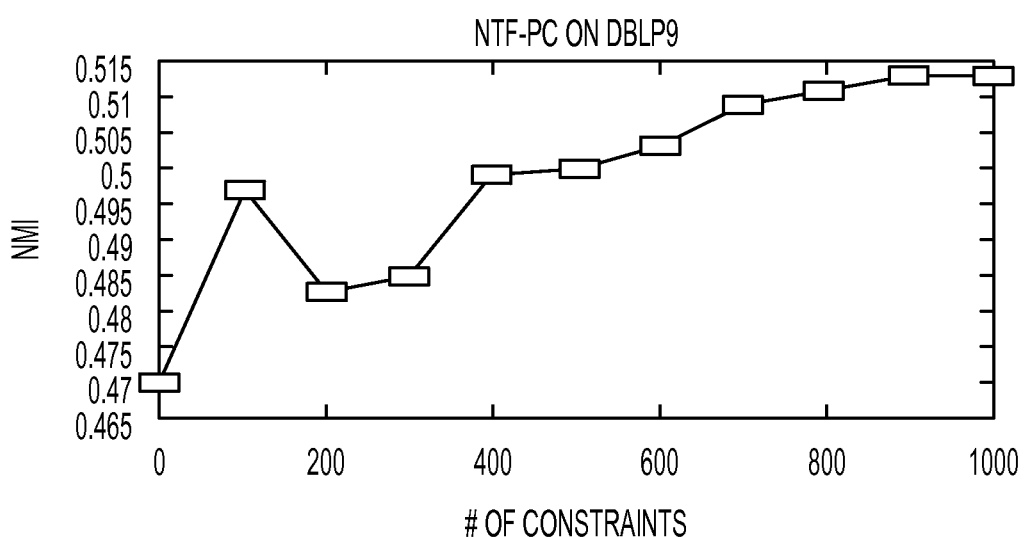

In an embodiment, clusters may be determined 125 by a processing device, such as the one described in reference to FIG. 3.

Figure 2:
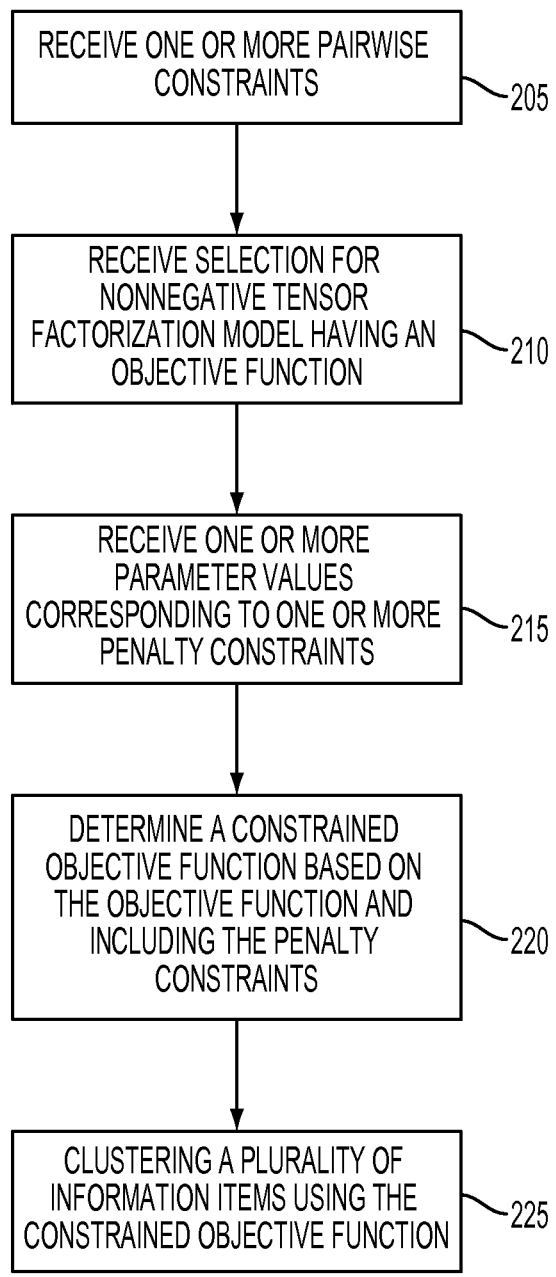
FIG. 2 depicts a flow chart of an exemplary method of performing nonnegative tensor factorization with pairwise constraints according to an embodiment.

FIG. 2 depicts a flow chart of an exemplary method of clustering a plurality of information items using nonnegative tensor factorization with pairwise constraints according to an embodiment. As shown in FIG. 2, one or more pairwise constraints may be identified 205 for a plurality of information items to be clustered. In an embodiment, the pairwise constraints may include one or more of "must-link" constraints and "cannot-link" constraints. In an embodiment, identifying 205 one or more pairwise constraints may be performed by receiving one or more pairwise constraints by a processing device, such as the one described in reference to FIG. 3 below.

Must-link pairwise constraints pertain to a plurality of information items intended to be in the same cluster according to prior knowledge. Must-link constraints can be represented using a pairwise constraint matrix M', where entries of M' with values of 1 indicate that the corresponding row information item and column information item tend to belong to the same cluster and entries of M' with values of 0 indicate that no defined relationship is known between the corresponding information items.

Conversely, cannot-link pairwise constraints pertain to pairs of information items intended to be in different clusters according to prior knowledge. Cannot-link constraints can be represented by a pairwise constraint matrix N', where entries of N' with values of 1 indicate that the corresponding row information item and column information item tend to belong to different clusters and entries of N' with values of 0 indicate that no defined relationship is known between the corresponding information items.

A nonnegative tensor factorization model may then be determined 210. The nonnegative tensor factorization model is associated with an objective function. In an embodiment, the objective function may be the nonnegative Parafac tensor factorization model. In an alternate embodiment, the objective function may be the nonnegative Tucker3 tensor factorization model. Alternate models may also be used within the scope of this disclosure. In an embodiment, determining 210 the nonnegative tensor factorization model may be performed by receiving a selection for the nonnegative tensor factorization model by a processing device, such as the one described in reference to FIG. 3.

One or more penalty constraint functions may be determined 215 with respect to the pairwise constraint matrices. Penalty constraint functions may have the following form:

$$Tr(-\alpha U^T M'U + \beta U^T N'U) = Tr(-\alpha U^T M'U) + Tr(\beta U^T N'U) = -\alpha \Sigma_{ij} m'_{ij}(U^T U)_{ij} + \beta \Sigma_{ij} n'_{ij}(U^T U)_{ij}$$

, where α and β are parameter values used to adjust the influence of the penalty terms. Weighting matrices M and N may be used to simplify the penalty constraint functions, where M=αM' and N=βN'. In an embodiment, determining 215 one or more penalty constraint functions may be performed by receiving one or more parameter values by a processing device, such as the one described in reference to FIG. 3. In such an embodiment, one or more parameter values may correspond to each of one or more penalty constraint functions.

A constrained objective function including the one or more penalty constraint functions may be determined 220. The constrained objective function may be based on the objective function for the selected nonnegative tensor factorization model, the one or more parameter values and the one or more pairwise constraints. For example, a constrained objective function based on the nonnegative Parafac tensor factorization model including the pairwise constraint penalty functions may be represented as follows:

$$J = \min_{U,V,S} \|X_{(1)} - U(S*V)^T\|_F^2 + Tr(U^T N^u U - U^T M^u U) + Tr(V^T N^v V - V^T M^v V) + Tr(S^T N^s S - S^T M^s S),$$

where $M^u$, $N^u \in \Re^{n \times n}$, $M^v$, $N^v \in \Re^{m \times m}$, and $M^s$, $N^s \in \Re^{p \times p}$ are must-link and cannot-link weighting matrices of information on rows (mode 1), columns (mode 2) and occasions (mode 3), respectively.

Clusters may be determined 225 for the plurality of modes by resolving the constrained objective function. In an embodiment, determining 225 clusters may be performed by applying a nonnegative multiplicative least square algorithm to the constrained objective function. The nonnegative multiplicative least square algorithm may update cluster information for one information type at a time while the other information types remain fixed. For the constrained objective function with the penalty constraint functions described above, the following computations may be performed iteratively until convergence or for an identified number of iterations in order to determine 225 clusters:

$$u_{ij} = u_{ij}\sqrt{\frac{(X_{(1)}(S*V))_{ij}^+ + (M^u U)_{ij} + (U(S*V)^T(S*V))_{ij}^-}{(X_{(1)}(S*V))_{ij}^- + (N^u U)_{ij} + (U(S*V)^T(S*V))_{ij}^+}},$$

$$v_{ij} = v_{ij}\sqrt{\frac{(X_{(2)}(S*U))_{ij}^+ + (M^v V)_{ij} + (V(S*U)^T(S*U))_{ij}^-}{(X_{(2)}(S*U))_{ij}^- + (N^v V)_{ij} + (V(S*U)^T(S*U))_{ij}^+}}, \text{ and}$$

$$s_{ij} = s_{ij}\sqrt{\frac{(X_{(3)}(V*U))_{ij}^+ + (M^s S)_{ij} + (S(V*U)^T(V*U))_{ij}^-}{(X_{(3)}(V*U))_{ij}^- + (N^s S)_{ij} + (S(V*U)^T(V*U))_{ij}^+}},$$

where $A^+$ and $A^-$ are a matrix with positive values and a matrix with negative values of A, respectively, such that $A=A^+-A^-$. In an embodiment, clusters may be determined by a processing device, such as the one described in reference to FIG. 3.

FIG. 3 depicts a block diagram of exemplary internal hardware that may be used to contain or implement program instructions according to an embodiment. A bus 300 serves as the main information highway interconnecting the other illustrated components of the hardware. CPU 305 is the central processing unit of the system, performing calculations and logic operations required to execute a program. CPU 305, alone or in conjunction with one or more of the other elements disclosed in FIG. 3, is an exemplary processing device, computing device or processor as such terms are used within this disclosure. Read only memory (ROM) 310 and random access memory (RAM) 315 constitute exemplary memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions may be stored in the ROM 310 and/or the RAM 315. Optionally, program instructions may be stored on a tangible computer readable storage medium such as a compact disk, a digital disk, flash memory, a memory card, a USB drive, an optical disc storage medium, such as Blu-ray™ disc, and/or other recording medium.

An optional display interface 330 may permit information from the bus 300 to be displayed on the display 335 in audio, visual, graphic or alphanumeric format. Communication with external devices may occur using various communication ports 340. An exemplary communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

An embedded system, such as a sub-system within a printing device or xerographic device, may optionally be used to perform one, some or all of the operations described herein. Likewise, a multiprocessor system may optionally be used to perform one, some or all of the operations described herein.

EXAMPLE 1

Real-world data sets from the DBLP computer science bibliography were used to conduct simulations of the aforementioned nonnegative tensor factorization methods with respect to nonnegative factorization methods. Author names, publication titles and publication years were extracted from the bibliography for each of a plurality of publications. 1000 active researchers with their publication titles for the years from 1988 through 2007 were selected for the simulations. The researchers and their publications were divided into 9 different research areas based on the authors' activities. These research areas served as class labels.

The data were preprocessed using standard text preprocessing techniques. For each year, a binary matrix with each entry denoting a co-occurrence of the corresponding author and the term in that year was constructed. As such, the data was organized as a three-way array with the author, term and year modes.

A first set of simulations (DBLP9) were conducted with all 9 research areas (database, data mining, software engineering, theory, computer vision, operating system, machine learning, networking, and natural language processing) for 20 years of publication titles of all 1000 authors utilizing 1000 key terms with the highest frequency of occurrence. A second set of simulations (DBLP4) were conducted with 20 years of publication titles and 250 authors randomly selected from the 1000 authors in 4 research areas (data mining, software engineering, theory and computer vision) and 200 key terms.

The Nonnegative Tensor Factorization with Partial Class Label method disclosed herein (NTF-PCL) was compared with 5 tensor factorization methods (Parafac, Tucker3, Nonnegative Parafac (NParafac), Nonnegative Tucker3 (NTucker3), and NParafac with V initialized with partial word class labels (NTF-Ini)) and 7 two-way data clustering methods (K-Means on the sum-up matrix (authors×terms) (KMeans(sum)), K-Means on the unfolded matrix of the three way (KMeans(ext)), PCA on the unfolded matrix followed by K-Means (KMeans(pca)), Information theoretic co-clustering algorithm on the sum-up matrix (InfoCo), Euclidean co-clustering algorithm on the sum-up matrix (EuclCo), Minimum squared residue co-clustering algorithm on the sum-up matrix (MinSqCo), K-Means clustering on each frontal slice of the three-way array and combined using clustering aggregation (ClusterAgg)). The clustering performance results, including accuracy (ACC) and Normalized Mutual Information (NMI) measures, for the DBLP4 and DBLP9 simulations are listed in Table 1.

TABLE 1

Clustering Performance Comparisons on DBLP

| Methods | DBLP4 | | DBLP9 | |
|---|---|---|---|---|
| | ACC | NMI | ACC | NMI |
| KMeans(sum) | 0.68 | 0.48 | 0.39 | 0.32 |
| KMeans(ext) | 0.40 | 0.23 | 0.25 | 0.01 |
| KMeans(pca) | 0.55 | 0.33 | 0.42 | 0.34 |
| Parafac | 0.80 | 0.61 | 0.39 | 0.19 |
| NParafac | 0.83 | 0.61 | 0.52 | 0.47 |
| Tucker3 | 0.70 | 0.54 | 0.41 | 0.20 |
| NTucker3 | 0.71 | 0.53 | 0.49 | 0.25 |
| ClusterAgg | 0.82 | 0.65 | 0.31 | 0.19 |
| InfoCo | 0.78 | 0.51 | 0.42 | 0.25 |
| EuclCo | 0.68 | 0.55 | 0.36 | 0.21 |
| MinSqCo | 0.60 | 0.41 | 0.41 | 0.32 |
| NTF-Ini | 0.85 | 0.63 | 0.53 | 0.47 |
| NTF-PCL | 0.88 | 0.68 | 0.55 | 0.49 |

Accuracy identifies one-to-one relationships between clusters and classes and measures the maximal extent to which each cluster contains data points from the corresponding class. Accuracy sums up the whole matching degree between all class-cluster pairs. Generally, a larger accuracy value indicates better clustering performance. Accuracy can be represented by the following:

$$ACC = \max \frac{\sum_{C_k, L_m} T(C_k, L_m)}{N},$$

where $C_k$ denotes the k-th cluster, and $L_m$ denotes the m-th class. $T(C_k, L_m)$ is the number of entities that belong to class m and are assigned to cluster k. Accuracy determines the maximum sum of $T(C_k, L_m)$ for all pairs of clusters and classes, and these pairs have no overlaps. Accuracy has a value between [0, 1].

Normalized Mutual Information is the mutual information between clustering and class knowledge divided by the maximum value of clustering entropy and class entropy. NMI has a value between [0, 1]. In general, a larger NMI value indicates better clustering quality. The NMI of the entire clustering solution is represented by the following:

$$NMI = \frac{\sum_{i,j} P(i, j) \log_2 \frac{P(i, j)}{P(i)P(j)}}{\sqrt{\max\left(\sum_i -P(i)\log_2 P(i), \sum_j -P(j)\log_2 P(j)\right)}},$$

where P(i) is the probability that an arbitrary data point belongs to cluster i, P(j) is the probability that an arbitrary data point belongs to class j, and P(i, j) is the joint probability that an arbitrary data point belongs to both cluster i and class j.

EXAMPLE 2

In order to test the clustering quality of Nonnegative Tensor Factorization with pairwise constraints, different numbers of pairwise constraints were randomly generated from the class labels of authors from the DBLP4 and DBLP9 data sets described above. This is a semi-supervised problem that the author clustering is constrained with prior knowledge about authors. The clustering quality (i.e., Accuracy and NMI) of NTF with 100 to 1000 pairwise constraints with respect to the DBLP4 and DBLP9 data sets are shown in FIGS. 4A-4D.

Each of the curves represented in FIGS. 4A-4D rise above the initial points with zero pairwise constraints. As such, NTF-PC improved clustering quality in all cases. In addition, as the number of pairwise constraints increases, the clustering quality is generally increasing as well. When the number of constraints is significant, the clustering quality tends to be stable and optimized.

Figure 5A:
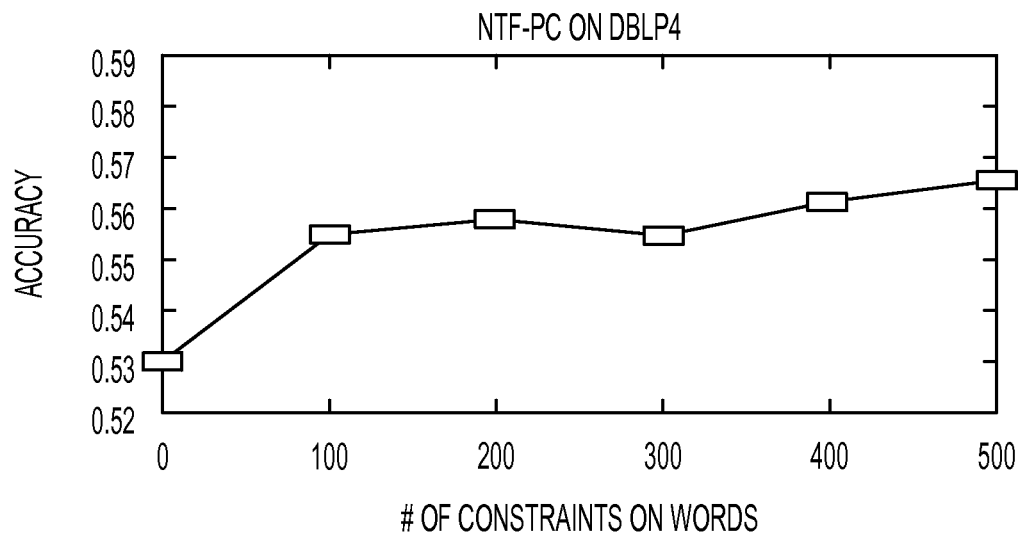
FIGS. 5A and 5B depict the clustering performance of nonnegative tensor factorization with pairwise constraints of words according to an example.
Figure 5B:
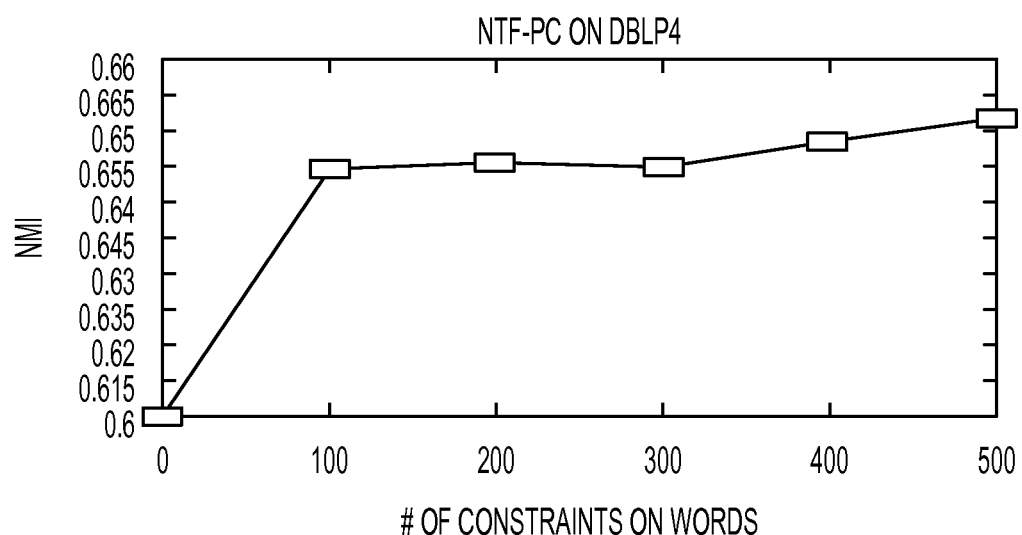

In addition, pairwise constraints may be placed on words instead of authors. FIGS. 5A and 5B depict the author clustering performance with respect to the number of word pairwise constraints. As shown in FIGS. 5A and 5B, the author clustering performance generally improved as the number of word constraints increased. Clustering performance substantially stabilized for 100 or more pairwise word constraints.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of clustering a plurality of information items using nonnegative tensor factorization, the method comprising:
    receiving, by a processing device, one or more class labels, wherein each class label corresponds to an information item;
    receiving, by the processing device, a selection for a nonnegative tensor factorization model having an associated objective function, wherein the nonnegative tensor factorization model comprises the nonnegative Parafac tensor factorization model;
    receiving, by the processing device, one or more parameter values, wherein each parameter value corresponds to one of one or more penalty constraints;
    determining, by the processing device, a constrained objective function including the one or more penalty constraints, wherein the constrained objective function is based on the objective function associated with the selected nonnegative tensor factorization model, the one or more parameter values and the one or more class labels; and
    determining, by the processing device, clusters for the plurality of information items by evaluating the constrained objective function;
    wherein determining clusters comprises:

$$\text{determining } u_{ij} = u_{ij} \frac{(X_{(1)}(S*V) + \alpha_1 U_0)_{ij}}{(U(S*V)^T(S*V) + \alpha_1 E^u U)_{ij}}$$

for each $u_{ij}$, wherein:
$X_{(1)}$ is the first mode of tensor X,
U, V and S are matrices identifying clusters for first, second and third types of information items, respectively,
$u_{ij}$ is the (i, j)-th entry of U,
$\alpha_1$ represents a first parameter value of the one or more parameter values,
$U_0$ is a matrix identifying class labels for the first information item type, and $E^u$ is a diagonal matrix in which a 1 indicates prior knowledge for a corresponding first information item and a 0 indicates no prior knowledge for the corresponding first information item;

$$\text{determining } v_{ij} = v_{ij} \frac{(X_{(2)}(S*U) + \alpha_2 V_0)_{ij}}{(V(S*U)^T(S*U) + \alpha_2 E^v V)_{ij}}$$

for each $v_{ij}$, wherein:
$X_{(2)}$ is the second mode of tensor X,
$v_{ij}$ is the (i, j)-th entry of V,
$\alpha_2$ represents a second parameter value of the one or more parameter values,
$V_0$ is a matrix identifying class labels for the second information item type, and
$E^v$ is a diagonal matrix in which a 1 indicates prior knowledge for a corresponding second information item and a 0 indicates no prior knowledge for the corresponding second information item;

$$\text{determining } s_{ij} = s_{ij} \frac{(X_{(3)}(V*U) + \alpha_3 S_0)_{ij}}{(S(V*U)^T(V*U) + \alpha_3 E^s S)_{ij}}$$

for each $s_{ij}$ wherein:
$X_{(3)}$ is the third mode of tensor X,
$s_{ij}$ is the (i, j)-th entry of S,
$\alpha_3$ represents a third parameter value of the one or more parameter values,
$S_0$ is a matrix identifying class labels for the third information item type, and
$E^s$ is a diagonal matrix in which a 1 indicates prior knowledge for a corresponding third information item and a 0 indicates no prior knowledge for the corresponding third information item; and
repeating the determining steps until the values of $u_{ij}$, $v_{ij}$ and $s_{ij}$ converge.

2. The method of claim 1 wherein determining clusters comprises applying a nonnegative multiplicative least square algorithm to minimize the value of the constrained objective function.

3. The method of claim 1 wherein the nonnegative tensor factorization model comprises the nonnegative Tucker3 tensor factorization model.

4. A method of clustering a plurality of information items using nonnegative tensor factorization, the method comprising:
    receiving, by a processing device, one or more pairwise constraints, wherein each pairwise constraint corresponds to a plurality of information items;
    receiving, by the processing device, a selection for a nonnegative tensor factorization model having an associated objective function;
    receiving, by the processing device, one or more parameter values, wherein at least one parameter value corresponds to each of one or more penalty constraints, wherein the one or more penalty constraints comprise a penalty constraint having a penalty constraint function of the following form:

$$-\alpha \Sigma_{ij} m'_{ij} (U^T U)_{ij} + \beta \Sigma_{ij} n'_{ij} (U^T U)_{ij},$$

wherein $\alpha$ and $\beta$ are first and second parameter values, $m'_{ij}$ and $n'_{ij}$ are elements of must-link constraint matrix M' and cannot-link constraint matrix N', respectively, and U is a matrix identifying clusters for an information item type;

determining, by the processing device, a constrained objective function including the one or more penalty constraints, wherein the constrained objective function is based on the objective function associated with the selected nonnegative tensor factorization model, the one or more parameter values and the one or more pairwise constraints; and determining, by the processing device, clusters for the plurality of information items by evaluating the constrained objective function.

5. The method of claim 4 wherein determining clusters comprises applying a nonnegative multiplicative least square algorithm to minimize the value of the constrained objective function.

6. The method of claim 4 wherein the nonnegative tensor factorization model comprises the nonnegative Parafac tensor factorization model.

7. The method of claim 4 wherein the nonnegative tensor factorization model comprises the nonnegative Tucker3 tensor factorization model.

8. A method of clustering a plurality of information items using nonnegative tensor factorization, the method comprising:

receiving, by a processing device, one or more pairwise constraints, wherein each pairwise constraint corresponds to a plurality of information items;

receiving, by the processing device, a selection for a nonnegative tensor factorization model having an associated objective function, wherein the nonnegative tensor factorization model comprises the nonnegative Parafac tensor factorization model;

receiving, by the processing device, one or more parameter values, wherein at least one parameter value corresponds to each of one or more penalty constraints, determining, by the processing device, a constrained objective function including the one or more penalty constraints, wherein the constrained objective function is based on the objective function associated with the selected nonnegative tensor factorization model, the one or more parameter values and the one or more pairwise constraints; and determining, by the processing device, clusters for the plurality of information items by evaluating the constrained objective function;

wherein determining clusters comprises:

$$\text{determining } u_{ij} = u_{ij} \sqrt{\frac{(\underline{X}_{(1)}(S*V))^+_{ij} + (M^uU)_{ij} + (U(S*V)^T(S*V))^-_{ij}}{(\underline{X}_{(1)}(S*V))^-_{ij} + (N^uU)_{ij} + (U(S*V)^T(S*V))^+_{ij}}}$$

for each $u_{ij}$,
wherein:
$\underline{X}_{(1)}$ is the first mode of tensor X,
U, V and S are matrices identifying clusters for first, second and third types of information items, respectively,
$u_{ij}$ is the (i, j)-th entry of U,
$M^u$ and $N^u$ are must-link and cannot-link weighting matrices for the first information type,
$(\underline{X}_{(1)}(S*V))^+$ and $(\underline{X}_{(1)}(S*V))^-$ are matrices with positive and negative values of matrix $\underline{X}_{(1)}(S*V)$, respectively, and $((S*V)^T(S*V))^+$ and $((S*V)^T(S*V))^-$ are matrices with positive and negative values of matrix $((S*V)^T(S*V))$, respectively;

$$\text{determining } v_{ij} = v_{ij} \sqrt{\frac{(\underline{X}_{(2)}(S*U))^+_{ij} + (M^vV)_{ij} + (V(S*U)^T(S*U))^-_{ij}}{(\underline{X}_{(2)}(S*U))^-_{ij} + (N^vV)_{ij} + (V(S*U)^T(S*U))^+_{ij}}}$$

for each $v_{ij}$,
wherein:
$\underline{X}_{(2)}$ is the second mode of tensor X,
$v_{ij}$ is the (i, j)-th entry of V,
$M^v$ and $N^V$ are must-link and cannot-link weighting matrices for the second information type, and
$(\underline{X}_{(2)}(S*U))^+$ and $(\underline{X}_{(2)}(S*U))^-$ are matrices with positive and negative values of matrix $(\underline{X}_{(2)}(S*U))$, respectively, and
$((S*U)^T(S*U))^+$ and $((S*U)^T(S*U))^-$ are matrices with positive and negative values of matrix $((S*U)^T(S*U))$, respectively;

$$\text{determining } s_{ij} = s_{ij} \sqrt{\frac{(\underline{X}_{(3)}(V*U))^+_{ij} + (M^sS)_{ij} + (S(V*U)^T(V*U))^-_{ij}}{(\underline{X}_{(3)}(V*U))^-_{ij} + (N^sS)_{ij} + (S(V*U)^T(V*U))^+_{ij}}}$$

for each $s_{ij}$,
wherein:
$\underline{X}_{(3)}$ is the third mode of tensor X,
$s_{ij}$ is the (i, j)-th entry of S,
$M^s$ and $N^s$ are must-link and cannot-link weighting matrices for the third information type, and
$(\underline{X}_{(3)}(V*U))^+$ and $(\underline{X}_{(3)}(V*U))^-$ are matrices with positive and negative values of matrix $(\underline{X}_{(3)}(V*U))$, respectively, and
$((V*U)^T(V*U))^+$ and $((V*U)^T(V*U))^-$ are matrices with positive and negative values of matrix $((V*U)^T(V*U))$, respectively; and
repeating the determining steps until the values of $u_{ij}$, $v_{ij}$ and $s_{ij}$ converge.

9. A system for clustering information using nonnegative tensor factorization, the system comprising:

a processor; and
a processor-readable storage medium in communication with the processor,
wherein the processor-readable storage medium contains one or more programming instructions for performing the following when executed by the processor:

receiving one or more class labels, wherein each class label corresponds to an information item,
receiving a selection for a nonnegative tensor factorization model having an associated objective function,
receiving one or more parameter values, wherein each parameter value corresponds to one of one or more penalty constraints,
determining a constrained objective function including the one or more penalty constraints, wherein the constrained objective function is based on the objective function associated with the selected nonnegative tensor factorization model, the one or more parameter values and the one or more class labels, and
determining clusters for the plurality of nodes by evaluating the constrained objective function;

wherein determining clusters comprises:

$$\text{determining } u_{ij} = u_{ij} \frac{(X_{(1)}(S*V) + \alpha_1 U_0)_{ij}}{(U(S*V)^T(S*V) + \alpha_1 E^u U)_{ij}}$$

for each $u_{ij}$, wherein:
$X_{(1)}$ is the first mode of tensor X,
U, V and S are matrices identifying clusters for first, second and third types of information items, respectively,
$u_{ij}$ is the (i, j)-th entry of U,
$\alpha_1$ represents a first parameter value of the one or more parameter values,
$U_0$ is a matrix identifying class labels for the first information item type, and
$E^u$ is a diagonal matrix in which a 1 indicates prior knowledge for a corresponding first information item and a 0 indicates no prior knowledge for the corresponding first information item;

$$\text{determining } v_{ij} = v_{ij} \frac{(X_{(2)}(S*U) + \alpha_2 V_0)_{ij}}{(V(S*U)^T(S*U) + \alpha_2 E^v V)_{ij}}$$

for each $v_{ij}$, wherein:
$X_{(2)}$ is the second mode of tensor X,
$v_{ij}$ is the (i, j)-th entry of V,
$\alpha_2$ represents a second parameter value of the one or more parameter values,
$V_0$ is a matrix identifying class labels for the second information item type, and
$E^v$ is a diagonal matrix in which a 1 indicates prior knowledge for a corresponding second information item and a 0 indicates no prior knowledge for the corresponding second information item;

$$\text{determining } s_{ij} = s_{ij} \frac{(X_{(3)}(V*U) + \alpha_3 S_0)_{ij}}{(S(V*U)^T(V*U) + \alpha_3 E^s S)_{ij}}$$

for each $s_{ij}$, wherein:
$X_{(3)}$ is the third mode of tensor X,
$s_{ij}$ is the (i, j)-th entry of S,
$\alpha_3$ represents a third parameter value of the one or more parameter values,
$S_0$ is a matrix identifying class labels for the third information item type, and
$E^s$ is a diagonal matrix in which a 1 indicates prior knowledge for a corresponding third information item and a 0 indicates no prior knowledge for the corresponding third information item; and
repeating the determining steps until the values of $u_{ij}$, $v_{ij}$ and $s_{ij}$ converge.

10. The system of claim 9 wherein determining clusters comprises applying a nonnegative multiplicative least square algorithm to minimize the value of the constrained objective function.

11. The system of claim 9 wherein the nonnegative tensor factorization model comprises the nonnegative Parafac tensor factorization model.

12. The system of claim 9 wherein the nonnegative tensor factorization model comprises the nonnegative Tucker3 tensor factorization model.

13. A system for clustering information using nonnegative tensor factorization, the system comprising:
a processor; and
a processor-readable storage medium in communication with the processor,
wherein the processor-readable storage medium contains one or more programming instructions for performing the following when executed by the processor:
receiving one or more pairwise constraints, wherein each pairwise constraint corresponds to a plurality of information items,
receiving a selection for a nonnegative tensor factorization model having an associated objective function,
receiving one or more parameter values, wherein at least one parameter value corresponds to each of one or more penalty constraints, wherein the one or more penalty constraints comprise a penalty constraint having a penalty constraint function of the following form:

$$-\alpha \Sigma_{ij} m'_{ij}(U^T U)_{ij} + \beta \Sigma_{ij} n'_{ij}(U^T U)_{ij},$$

wherein $\alpha$ and $\beta$ are first and second parameter values, $m'_{ij}$ and $n'_{ij}$ are elements of must-link constraint matrix M' and cannot-link constraint matrix N', respectively, and U is a matrix identifying clusters for an information item type,
determining a constrained objective function including the one or more penalty constraints, wherein the constrained objective function is based on the objective function associated with the selected nonnegative tensor factorization model, the one or more parameter values and the one or more pairwise constraints, and
determining clusters for the plurality of information items by evaluating the constrained objective function.

14. The system of claim 13 wherein determining clusters comprises applying a nonnegative multiplicative least square algorithm to minimize the value of the constrained objective function.

15. The system of claim 13 wherein the nonnegative tensor factorization model comprises the nonnegative Parafac tensor factorization model.

16. The system of claim 13 wherein the nonnegative tensor factorization model comprises the nonnegative Tucker3 tensor factorization model.

17. A system for clustering information using nonnegative tensor factorization, the system comprising:
a processor; and
a processor-readable storage medium in communication with the processor,
wherein the processor-readable storage medium contains one or more programming instructions for performing the following when executed by the processor:
receiving one or more pairwise constraints, wherein each pairwise constraint corresponds to a plurality of information items,
receiving a selection for a nonnegative tensor factorization model having an associated objective function,
receiving one or more parameter values, wherein at least one parameter value corresponds to each of one or more penalty constraints determining a constrained objective function including the one or more penalty constraints, wherein the constrained objective function is based on the objective function associated with the selected nonnegative tensor factorization model, the one or more parameter values and the one or more pairwise constraints, and determining clusters for the plurality of information items by evaluating the constrained objective function, wherein determining clusters comprises:

$$\text{determining } u_{ij} = u_{ij} \sqrt{\frac{(\underline{X}_{(1)}(S*V))^+_{ij} + (M^u U)_{ij} + (U(S*V)^T(S*V))^-_{ij}}{(\underline{X}_{(1)}(S*V))^-_{ij} + (N^u U)_{ij} + (U(S*V)^T(S*V))^+_{ij}}}$$

for each $u_{ij}$, wherein:

$\underline{X}_{(1)}$ is the first mode of tensor $\underline{X}$,

U, V and S are matrices identifying clusters for first, second and third types of information items, respectively, $u_{ij}$ is the (i, j)-th entry of U, $M^u$ and $N^u$ are must-link and cannot-link weighting matrices for the first information type, $(\underline{X}_{(1)}(S*V))^+$ and $(\underline{X}_{(1)}(S*V))^-$ are matrices with positive and negative values of matrix $(\underline{X}_{(1)}(S*V))$, respectively, and $((S*V)^T(S*V))^+$ and $((S*V)^T(S*V))^-$ are matrices with positive and negative values of matrix $((S*V)^T(S*V))$, respectively;

$$\text{determining } v_{ij} = v_{ij} \sqrt{\frac{(\underline{X}_{(2)}(S*U))^+_{ij} + (M^v V)_{ij} + (V(S*U)^T(S*U))^-_{ij}}{(\underline{X}_{(2)}(S*U))^-_{ij} + (N^v V)_{ij} + (V(S*U)^T(S*U))^+_{ij}}}$$

for each $v_{ij}$, wherein:

$\underline{X}_{(2)}$ is the second mode of tensor $\underline{X}$, $v_{ij}$ is the (i, j)-th entry of V, $M^v$ and $N^V$ are must-link and cannot-link weighting matrices for the second information type, and $(\underline{X}_{(2)}(S*U))^+$ and $(\underline{X}_{(2)}(S*U))^-$ are matrices with positive and negative values of matrix $(\underline{X}_{(2)}(S*U))$, respectively, and $((S*U)^T(S*U))^+$ and $((S*U)^T(S*U))^-$ are matrices with positive and negative values of matrix $((S*U)^T(S*U))$, respectively;

$$\text{determining } s_{ij} = s_{ij} \sqrt{\frac{(\underline{X}_{(3)}(V*U))^+_{ij} + (M^s S)_{ij} + (S(V*U)^T(V*U))^-_{ij}}{(\underline{X}_{(3)}(V*U))^-_{ij} + (N^s S)_{ij} + (S(V*U)^T(V*U))^+_{ij}}}$$

for each $s_{ij}$, wherein:

$\underline{X}_{(3)}$ is the third mode of tensor $\underline{X}$, $s_{ij}$ is the (i, j)-th entry of S, $M^s$ and $N^s$ are must-link and cannot-link weighting matrices for the third information type, and $(\underline{X}_{(3)}(V*U))^+$ and $(X_{(3)}(V*U))^-$ are matrices with positive and negative values of matrix $(\underline{X}_{(3)}(V*U))$, respectively, and $((V*U)^T(V*U))^+$ and $((V*U)^T(V*U))^-$ are matrices with positive and negative values of matrix $((V*U)^T(V*U))$, respectively; and repeating the determining steps until the values of $u_{ij}$, $v_{ij}$ and $s_{ij}$ converge.

\* \* \* \* \*